(12) United States Patent
Cao et al.

(10) Patent No.: US 11,761,746 B2
(45) Date of Patent: Sep. 19, 2023

(54) METHOD FOR RAPIDLY MEASURING ROLLER PASS MAJOR SEMI-AXIS OF THREE-ROLLER REDUCING MILL

(71) Applicant: DAYE SPECIAL STEEL CO., LTD., Hubei (CN)

(72) Inventors: Hua Cao, Hubei (CN); Youli Huangfu, Hubei (CN); Housheng Zhang, Hubei (CN); Jun Wu, Hubei (CN); Fan Xie, Hubei (CN)

(73) Assignee: DAYE SPECIAL STEEL CO., LTD., Huangshi (CN)

( * ) Notice: Subject to any disclaimer, the term of this patent is extended or adjusted under 35 U.S.C. 154(b) by 0 days.

(21) Appl. No.: 17/792,496

(22) PCT Filed: May 31, 2021

(86) PCT No.: PCT/CN2021/097510
§ 371 (c)(1),
(2) Date: Jul. 13, 2022

(87) PCT Pub. No.: WO2021/239148
PCT Pub. Date: Dec. 2, 2021

(65) Prior Publication Data
US 2023/0074692 A1    Mar. 9, 2023

(30) Foreign Application Priority Data

May 29, 2020   (CN) .......................... 202010479489.0

(51) Int. Cl.
*G01B 5/02*   (2006.01)
*G01B 3/04*   (2006.01)
*G01B 3/38*   (2006.01)

(52) U.S. Cl.
CPC ................ *G01B 5/02* (2013.01); *G01B 3/04* (2013.01); *G01B 3/38* (2013.01)

(58) Field of Classification Search
CPC ............... G01B 3/04; G01B 3/38; G01B 5/02
See application file for complete search history.

(56) References Cited

U.S. PATENT DOCUMENTS 2,464,387 A * 3/1949 Foster .................... B24B 19/10
33/549

FOREIGN PATENT DOCUMENTS

| CN | 103047922 A | 4/2013 |
| CN | 103234423 A | 8/2013 |

(Continued)

OTHER PUBLICATIONS

International Search Report issued in International Patent Application No. PCT/CN2021/097510 dated Aug. 25, 2021.

(Continued)

*Primary Examiner* — John Fitzgerald
(74) *Attorney, Agent, or Firm* — United IP Counselors, LLC

(57) ABSTRACT

A method for rapidly measuring the roller pass major semi-axis of a three-roller reducing mill to improve the outer-diameter precision and surface quality of a steel pipe includes selecting a corresponding value of the average diameter of an elliptical pass, a value of a first major semi-axis, and a value of a minor semi-axis according to a rack station number of a special numerical control lathe; calculating a value of a first line segment according to an elliptic equation, the obtained value of the first major semi-axis, and the obtained value of the minor semi-axis; calculating a value of a second major semi-axis according to the right-angle triangle theorem and the value of the first line segment; and measuring a value of the first dimension by attaching three claws of a three-claw internal micrometer to three roller gaps.

3 Claims, 3 Drawing Sheets

(56) References Cited

FOREIGN PATENT DOCUMENTS

| CN | 104613869 | A |   | 5/2015  |             |
|----|-----------|---|---|---------|-------------|
| CN | 105363782 | A |   | 3/2016  |             |
| CN | 105363783 | A |   | 3/2016  |             |
| CN | 105363783 | B | * | 7/2017  | ............ B21B 19/10 |
| CN | 110961470 | A |   | 4/2020  |             |
| CN | 111664772 | A |   | 9/2020  |             |
| CN | 111664772 | B |   | 7/2021  |             |
| JP | 2000094008| A |   | 4/2000  |             |
| JP | 2014042949| A | * | 3/2014  |             |

OTHER PUBLICATIONS

Written Opinion issued in International Patent Application No. PCT/CN2021/097510 dated Aug. 25, 2021.
Notification of Grant of Invention Patent in CN202010479489.0, dated May 27, 2021 with English Translation.

* cited by examiner

METHOD FOR RAPIDLY MEASURING ROLLER PASS MAJOR SEMI-AXIS OF THREE-ROLLER REDUCING MILL

BACKGROUND

Field of Invention

The present invention belongs to the technical field of roller mill equipment adjustment, especially relates to a method for rapidly measuring roller pass major semi-axis of three-roller reducing mill.

Background of the Invention

The former three-roller reducing mill pass has the following problems in processing and use: 1. The three-point internal micrometer can only measure the minor semi-axes of the reducing mill pass (after processing and after use), while the major semi-axis cannot be measured (after processing and after use); 2. If the pass size (major and minor semi-axes) is measured by making a pass template, then a pass template needs to be made and the cost is high; 3. Since the major semi-axis cannot be measured, the accuracy of the outer diameter of the steel pipe and the surface quality (such as black thread and rolling) cannot be guaranteed.

When machining the roller pass of the three-roller reducing mill, it is easy to have errors in pass processing size due to the lack of measurement of the major semi-axis of the roller pass of the three-roller reducing mill. After the pass of the three-roller reducing mill is wrong, one or more black threads, rolling defects (the depth reaches 0.1 mm~0.3 mm) and internal ellipse defects (usually 0.8~0 9 mm, and in severe cases 1.0~1.2 mm) are easy to appear after the steel pipe is rolled by the reducing mill. These two defects are: 1. The external surface of steel pipe is seriously affected; 2. Significant impact to user use (black skin during internal surface processing).

The method for rapidly measuring roller pass major semi-axis of three-roller reducing mill according to the present invention preferably solves the measurement (after processing and after use) of the roller pass (major semi-axis) of the three-roller reducing mill, especially when the wear amount of the major semi-axis exceeds a specified wear amount, and performs heavy turning of the pass of the reducing mill, to avoid the occurrence of accuracy and quality of the steel pipe. This measurement method greatly improves the outside diameter accuracy and surface quality of the steel pipe.

SUMMARY

In view of the deficiencies of the prior art, the present invention provides a method for rapidly measuring roller pass major semi-axis of three-roller reducing mill, which solves the measurement of roller pass major semi-axis of three-roller reducing mill and improves the accuracy of the outer diameter and the surface quality of the steel pipe.

In order to achieve the above object, the present invention provides the following technical solutions: A method for rapidly measuring roller pass major semi-axis of three-roller reducing mill, comprising the steps of: selecting a corresponding value of the average diameter of an elliptical pass, a value of a first major semi-axis and a value of a minor semi-axis from a three-roller pass data table according to a rack station number of a special numerical control lathe; calculating a value of a first line segment according to an elliptic equation, the obtained value of the first major semi-axis, and the obtained value of the minor semi-axis; calculating a value of a second major semi-axis according to the right-angle triangle theorem and the value of the first line segment; measuring a first dimension by attaching three claws of a three-claw internal micrometer to three roller gaps; or attaching one end of inner calipers to any roller gap, and attaching the other end to the bottom of a roller arc opposite the roller gap to obtain a second dimension; comparing the value of the first dimension with the second major semi-axis, if the value of the first dimension is equal to twice of the second major semi-axis, then proving that the processing size of the major semi-axis of the roller pass of the three-roller reducing mill is correct, otherwise proving that the processing size of the major semi-axis of the roller pass of the three-roller reducing mill is wrong; or comparing the value of the second dimension with the sum of the second major semi-axis and the minor semi-axes, if the value of the second dimension is equal to the sum of the second major semi-axis and the minor semi-axes, then proving that the processing dimension of the major semi-axis of the roller pass of the three-roller reducing mill is correct, otherwise proving that the processing dimension of the major semi-axis of the roller pass of the three-roller reducing mill is wrong; the three-roller reducing mill pass is composed of ends of three rollers with an included angle of 120° between axes; the end of each roller is formed by two axially symmetric inclined planes sandwiching an elliptical arc; the inclined planes of two adjacent rollers are closely attached to each other, so that three elliptical arcs are connected end to end to form the three-roller reducing mill pass, the included angle between the inclined plane and the axis is 60°; the focus point of the elliptical arc located on the axis, and the included angle between the lines connecting the focus point to two end points of the elliptical arc is 120°; the first segment is half of a connecting line for connecting two end points of the elliptical arc; the second major semi-axis is a connecting line for connecting the focal point and one end point of the elliptical arc.

Preferably, calculating the value of the second major semi-axis according to the right triangle theorem and the value of the first segment, specifically comprising: calculating the value of the second major semi-axis according to the Pythagorean theorem or trigonometric function of the right triangle, the value of the first segment and the included angle α1 between the first segment and the second major semi-axis, wherein the included angle α1 is 30°; the right-angled triangle is composed of the first segment, the second major semi-axis and the second segment successively connected end to end.

Preferably, the elliptic equation is:

$$X^2\left(\frac{1}{a^2} + \frac{1}{3b^2}\right) = 1$$

X is the value of the first segment, a is the value of the first major semi-axis and b is the value of the minor semi-axes.

The technical solution provided by the embodiments of the present invention brings the following advantages:

After measuring the major and minor semi-axes of the roller pass of the three-roller reducing mill after processing, the present invention eliminates the problem of steel pipe quality caused by the wrong size of the roller pass of the three-roller reducing mill after processing, ensures the accuracy of the roller pass of the three-roller reducing mill, greatly improves the surface and dimensional accuracy of the steel pipe, and the quality of the steel pipe has been approved by the user. The market competitiveness is further improved.

Figure 1:
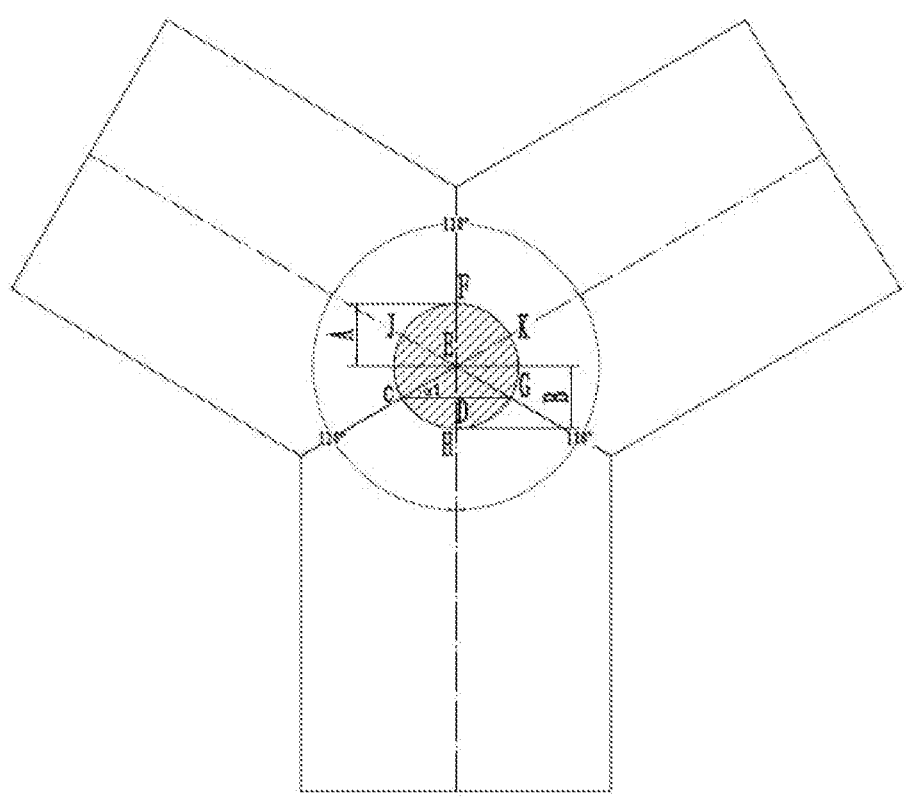
FIG. 1 is a schematic view of a pass structure composed of three rollers.

In the figures: roller 10, first inclined plane 20, elliptical arc 40, second inclined plane 60.

DETAILED DESCRIPTION OF THE INVENTION

The present invention will be described in detail below with reference to the accompanying drawings and in conjunction with the embodiments. The various embodiments are provided by way of interpretation of the invention and not limiting the invention. Indeed it will be apparent to those skilled in the art that modifications and variations may be made in the present invention without departing from the scope or spirit of the invention. For example features shown or described as part of one embodiment may be used in another embodiment to produce yet another embodiment. It is therefore desirable that the invention encompass such modifications and variations falling within the scope of the appended claims and their equivalents.

In the description of the invention, the terms "longitudinal," "transverse," "up," "down," "front," "back," "left," "right," "vertical," "horizontal," "top," "bottom," and the like denote orientation or positional relationships based on those shown in the drawings and are intended for ease of description only and not to require that the invention must be constructed and operated in a particular orientation and therefore cannot be construed as limiting to the invention. The terms "joint", "connected" and "set" used in the present invention should be understood in a broad sense, for example, may be a fixed connection or a detachable connection; It can be directly connected or indirectly connected through intermediate components; It may be a wired electrical connection, a radio connection, or a wireless communication signal connection, and the specific meanings of the above terms may be understood by those of ordinary skill in the art on a case-by-case basis.

Figure 2:
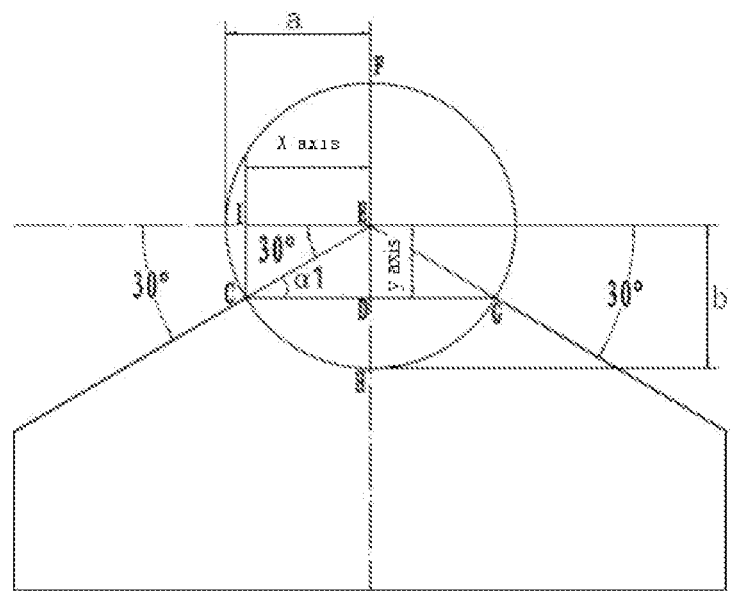
FIG. 2 is a schematic view showing the structure of an unprocessed single roller.
Figure 3:
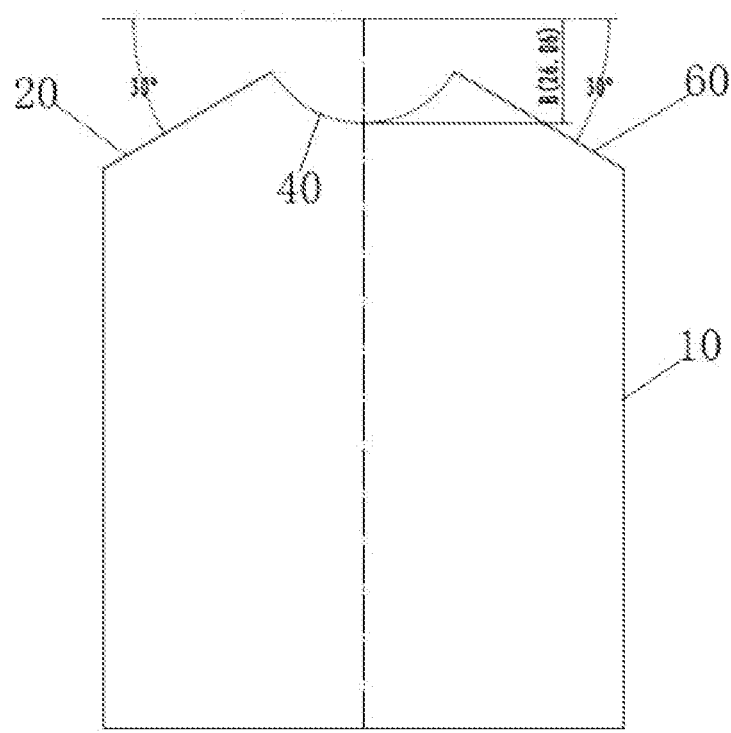
FIG. 3 is a schematic view showing the pass structure after the processing of the single roller.

Referring to FIGS. 1-3, according to an embodiment of the present invention, there is provided a method for rapidly measuring the major semi-axis of the roller pass of the three-roller reducing mill, comprising the steps of:

S11: selecting the corresponding value of the average diameter of the elliptical pass, the value of the first major semi-axis and the value of the minor semi-axes in the three-roller pass data table according to the station number of the machine frame of the special numerical control lathe.

S22: calculating a value of the first segment according to an elliptic equation, the obtained value of the first major semi-axis and the obtained value of the minor semi-axes.

S33: calculating the value of the second major semi-axis according to the right triangle theorem and the value of the first segment.

S44: obtaining the value of the first dimension by measuring three points of a three-point internal micrometer against three roller gaps (i.e., points C, G, and F); or acquiring the value of the second dimension by one end of the inner caliper against any roller gap and the other end against the bottom of the roll arc opposite the roller gap.

S55: comparing the value of the first dimension with the second major semi-axis, if the value of the first dimension is equal to twice of the second major semi-axis, then proving that the processing size of the major semi-axis of the roller pass of the three-roller reducing mill is correct, otherwise proving that the processing size of the major semi-axis of the roller pass of the three-roller reducing mill is wrong; or comparing the value of the second dimension with the sum of the second major semi-axis and the minor semi-axes, if the value of the second dimension is equal to the sum of the second major semi-axis and the minor semi-axes, then proving that the processing dimension of the major semi-axis of the roller pass of the three-roller reducing mill is correct, otherwise proving that the processing dimension of the major semi-axis of the roller pass of the three-roller reducing mill is wrong.

The value of the second major semi-axis is calculated according to the value of the first major semi-axis, the value of the minor semi-axes, the elliptic equation and the right triangle theorem in the three-roller pass data table in present invention. The roller pass of the three-roller reducing mill after processing is measured, and the measured value is compared with twice the second major semi-axis or the sum of the value of the second long axis and the value of the minor semi-axes in the present invention, so that the present invention eliminates the problem of steel pipe quality caused by the wrong size of the roller pass of the three-roller reducing mill after processing, ensures the accuracy of the roller pass of the three-roller reducing mill, greatly improves the surface and dimensional accuracy of the steel pipe, and the quality of the steel pipe has been approved by the user. The market competitiveness is further improved.

Referring to FIGS. 1 and 3, the pass of the three-roller reducing mill consists of ends of three rollers 10 with an included angle of 120° between axes; The end of each roller 10 is formed by the first inclined plane 20 and the second inclined plane 60 sandwiching an elliptical arc 40 (i.e., a roller arc) between the first inclined plane 20 and the second inclined plane 60, wherein the first inclined plane 20 and the second inclined plane 60 are about the axis of the roller symmetry. The focus point of the elliptical arc 40 (i.e., point E) is located on the axis, and the focus point of the elliptical arc 40 is the center point of the three-roller reducing mill pass, the included angle between the lines connecting the focus point to two end points of the elliptical arc is 120°; See Table 1 for the long and short half axes of the ellipse in which each elliptical arc is located.

The inclined planes of two adjacent rollers 10 are closely attached to each other, so that three elliptical arcs 40 are connected end to end to form the three-roller reducing mill pass, the angle between the inclined plane and the axis is 60°.

In an embodiment of the invention, in order to calculate the value of the second major semi-axis more conveniently and quickly, the value of the second major semi-axis is calculated according to the Pythagorean theorem or trigonometric function of the right triangle, the value of the first segment and the included angle $\alpha 1$ between the first segment and the second major semi-axis, wherein the included angle $\alpha 1$ between the inclined plane and the axis in the right triangle is 60°, so the included angle $\alpha 1$ is 30; The right triangle is composed of the first segment, the second major semi-axis and the second segment successively connected end to end.

In the embodiment of the invention, the elliptic equation of the invention is:

$$X^2\left(\frac{1}{a^2} + \frac{1}{3b^2}\right) = 1$$

X is the value of the first segment, a is the value of the first major semi-axis in the three-roller pass data table and b is the value of the minor semi-axes in the three-roller pass data table.

The invention also provides an embodiment of a method for measuring the major semi-axis of the roller pass of the three-roller reducing mill, when the roller pass of the three-roller reducing mill is processed, the whole frame archway needs to be hoisted into a special numerical control lathe for processing. The machining operator will process the roller pass of the three-roller reducing mill according to the three-roller pass data table.

The roller pass data of the three-roller reducing mill is shown in Table 1 (including the major and minor semi-axes data of the ellipse corresponding to the elliptical arc part of each roll):

Referring to FIGS. 2 and 3, the value of the first major semi-axis in the three-roller pass data table is known as 26.43 mm (a=26.43), and the value of the minor semi-axes in the three-roller pass data table is known as 26.06 mm (b=26.06), and the value of the first segment is calculated according to the elliptic equation, wherein the first segment is the segment CD in the FIG. 3 or FIG. 1, namely:

$$X^2\left(\frac{1}{a^2} + \frac{1}{3b^2}\right) = 1,$$

$$X^2\left(\frac{1}{26.43^2} + \frac{1}{3(26.06)^2}\right) = 1$$

$$X = 22.81 \text{ mm}$$

X is the value of the first segment, namely, X=CD=22.81 mm

It is known that CD=22.81 mm, and the first segment is half of a connecting line used for connecting two end points of the elliptical arc, namely, then the connecting line is the segment CG in FIG. 1, namely, CG=CD*2=22.81*2=45.62 mm; then according to the value of the first segment and the ¢ 50.8 mm$^{series}$

| Number of frames | Station number (No) | Average diameter of pass (d) | Reducing amount | Reducing rate (ρ) | major semi-axis (A) | minor semi-axis (B) | 2B | Ellipticity (ξ) | Cutter diameter (φ) | Cutter distance (x) | Spreading amount |
|---|---|---|---|---|---|---|---|---|---|---|---|
|  |  | 69 |  |  | 34.50 | 34.50 |  |  |  |  |  |
| 1 | 1 | 67.84 | 1.16 | 1.68 | 34.25 | 33.59 | 67.18 | 1.01970 | 69.62 | 18.72 | −0.25 |
| 2 | 2 | 65.87 | 1.97 | 2.90 | 33.26 | 32.62 | 65.23 | 1.01960 | 67.60 | 18.49 | −0.33 |
| 3 | 3 | 63.96 | 1.91 | 2.90 | 32.29 | 31.67 | 63.35 | 1.01950 | 65.64 | 18.27 | −0.33 |
| 4 | 4 | 62.11 | 1.85 | 2.90 | 31.35 | 30.76 | 61.51 | 1.01940 | 63.74 | 18.04 | −0.32 |
| 5 | 5 | 60.31 | 1.80 | 2.90 | 30.44 | 29.87 | 59.73 | 1.01930 | 61.89 | 17.81 | −0.31 |
| 6 | 6 | 58.56 | 1.74 | 2.89 | 29.56 | 29.00 | 58.01 | 1.01920 | 60.10 | 17.58 | −0.30 |
| 7 | 7 | 56.87 | 1.70 | 2.90 | 28.70 | 28.16 | 56.33 | 1.01910 | 58.35 | 17.35 | −0.30 |
| 8 | 8 | 55.22 | 1.65 | 2.90 | 27.87 | 27.35 | 54.70 | 1.01900 | 56.66 | 17.13 | −0.30 |
| 9 | 9 | 53.62 | 1.60 | 2.90 | 27.06 | 26.56 | 53.11 | 1.01890 | 55.01 | 16.90 | −0.29 |
| 10 | 10 | 52.49 | 1.13 | 2.10 | 26.43 | 26.06 | 52.12 | 1.01400 | 53.50 | 14.41 | −0.13 |
| 11 | 11 | 51.54 | 0.94 | 1.80 | 25.90 | 25.64 | 51.29 | 1.01000 | 52.25 | 12.08 | −0.16 |
| 12 | 12 | 51.20 | 0.34 | 0.66 | 25.60 | 25.60 | 51.20 | 1.00000 | 51.20 | 0.00 | −0.04 |

In the embodiment of the invention, the station number of the special numerical control lathe is selected as No. 10, and the value of the corresponding average diameter of the pass is selected as 52.49, the value of the first major semi-axis is 26.43 mm, and the value of the minor semi-axes is 26.06 mm in the three-roller pass data table.

The roller pass of the three-roller reducing mill consists of three circular arcs, which are arranged in the frame at an angle of 120 degrees in the circumferential direction of the reducing mill frame.

FIGS. 1 and 2 define axes A and B, as well as points C-J. In this description, line segments are named by reference to their endpoints, in accordance with mathematical convention. For example, segment CE is the segment extending from point C to point E. Referring to FIGS. 1 and 2, A is the second major semi-axis, and the second major semi-axis is the connecting line used to connect the center point of the three-roller pass and one end point of the ellipse arc, that is, the segment CE, the segment EF, the segment EG in FIG. 1. B is the minor semi-axes, namely the segment EH, the segment EJ, and the segment EK in FIG. 1, and the shaded part in FIG. 1 is the roller pass of the three-roller reducing mill.

tangent value of the included angle α1 between the first segment and the second major semi-axis, the value of the second segment is calculated; the second segment is the segment used for connecting the focus point and the middle point of the connecting line, namely, the segment ED in FIG. 1, wherein the included angle α1 is ∠ECD in FIG. 1 or FIG. 3, and α1=∠ECD=30°, namely:

$$\tan\alpha_1 = \frac{y}{x}$$

$$y = x\tan\alpha_1$$

$$y = 0.57735 \times 22.81 = 13.17 \text{ mm}$$

wherein Y is the value of the second segment, namely, ED=Y=13.17 mm.

Then according to the known value of the first segment and the value of the second segment, and using the right triangle Pythagoras theorem, to calculate the value of the second major semi-axis, wherein the right-angle triangle is composed of the first segment, the second major semi-axis and the second segment successively connected end to end, wherein the right angle triangle is the triangle ECD in FIG. 1 or FIG. 3, and wherein the second major semi-axis is the segments CE, EF and EG in FIG. 1, namely:

$$M^2=Y^2+X^2$$

$$M^2=13.17^2+22.81^2$$

$$M=26.34 \text{ mm}$$

wherein M is the value of the second major semi-axis, namely, CE=EF=EG=M=26.34 mm.

Or according to the right triangle ECD, ∠ECD=30°, ED=13.17 mm can also calculate CE (according to the right triangle theorem, the side opposite the 30° angle is half of the hypotenuse), then CE=M=2*Y=2*13.17=26.34 mm.

Or according to the known ED=13.17 mm and Sin ∠ECD=Sin 30°, the value of CE can also be calculated as:

$$\frac{ED}{\text{Sin } 30°}$$

CE=26.34 mm.

In this embodiment, another method for calculating the value of the major semi-axis of the pass (the value of CE) is provided, it is known that CD=22.81 mm, the cosine value of the angle α1 between the first segment and the second major semi-axis, and the included angle α1 is ∠ECD in FIG. 1 or FIG. 3, α1=∠ECD=30°, namely:

$$\cos\alpha 1 = \frac{X}{M}$$

$$M = \frac{X}{\cos\alpha 1} = CE = \frac{CD}{\cos 30°} = 26.34 \text{ mm}$$

When measuring, if the three-point internal micrometer is used to measure the pass of three rollers (the three points of the three-point internal micrometer are measured against the gaps of three rollers C, G, F), the measured value of the first dimension is then compared to twice the value of the second major semi-axis, which is EF*2=26.34*2=52.68 mm. If the measured value of the first dimension is equal to twice of the second major semi-axis, then proving that the processing size of the major semi-axis of the roller pass of the three-roller reducing mill is correct, otherwise proving that the processing size of the major semi-axis of the roller pass of the three-roller reducing mill is wrong.

When measuring, if the inner caliper is used to measure the pass of three rollers, when the inner caliper is used to measure, it is necessary to place one end of the inner caliper against the roller gap and the other end against the arc bottom (the inner caliper must be measured vertically when measuring), and then use a steel ruler to measure the distance of the inner caliper; it is then necessary to compare the value of the second dimension measured by the inner caliper with the sum of the value of the major semi-axis of the pass and the minor semi-axes in the three-roller pass data table, i. E. Ef+B (minor semi-axes)=26.34+26.06=52.40 mm. If the measured value of the second dimension is the same as the sum of the value of the second major semi-axis and the minor semi-axes in the three-roller pass data table, then proving that the processing dimension of the major semi-axis of the roller pass of the three-roller reducing mill is correct; if the measured value of the second dimension is different from the sum of the value of the second major semi-axis and the minor semi-axes in the three-roller pass data table, proving that the processing dimension of the major semi-axis of the roller pass of the three-roller reducing mill is wrong.

If the processing dimension of the major semi-axis of the roller pass of the three-roller reducing mill is wrong, the pass can only be re-processed to other pass of larger size.

When using the method of the present invention to measure the inner diameter ellipticity data of the roller pass (major semi-axis) of the three-roller reducing mill, and making test measurement on the 40 CrB steel with the design specification of 62.5×14 based on the original roller pass (major semi-axis) of the three-roller reducing mill with the existing design, the process parameters are the same, and the comparison of the measured inner diameter ellipticity data (unit: mm) is shown in Table 2:

| | Steel grade 40 CrB Finished product specifications: 62.5 × 14 | | | | | | |
|---|---|---|---|---|---|---|---|
| | Wrong pass of major semi-axis of roller | | | Correct pass of major semi-axis of roller | | | |
| Experiment Times | Minimum | Maximum | Inner diameter Ellipse difference | Minimum | Maximum | Inner diameter Ellipse difference | Comparison |
| 1 | 33.29 | 34.20 | 0.91 | 33.12 | 33.89 | 0.77 | −0.14 |
| 2 | 33.21 | 34.20 | 0.99 | 33.40 | 34.14 | 0.74 | −0.25 |
| 3 | 33.20 | 34.40 | 1.20 | 33.27 | 34.05 | 0.78 | −0.42 |
| 4 | 33.10 | 34.12 | 1.02 | 33.19 | 33.79 | 0.60 | −0.42 |
| 5 | 33.15 | 34.25 | 1.10 | 33.34 | 34.07 | 0.73 | −0.37 |
| Average value | 33.19 | 34.23 | 1.04 | 33.26 | 33.98 | 0.72 | −0.32 |

1. The data unit in the above table is mm
2. The data in the above table are measured on the real object under the same temperature, same steel grade, same specification and same technological parameters.
3. The minimum value in the above table refers to the minimum value of the inner diameter of the steel pipe produced, and the maximum value refers to the maximum value of the inner diameter of the steel pipe produced.

The above comparison table is obtained by the applicant through many experiments, and combined with the above content, it can be more powerfully explained that after measuring the major and minor semi-axes of the roller pass of the three-roller reducing mill after processing, the present invention eliminates the problem of steel pipe quality caused by the wrong size of the roller pass of the three-roller reducing mill after processing, ensures the accuracy of the roller pass of the three-roller reducing mill, greatly improves the surface and dimensional accuracy of the steel pipe, the quality of the steel pipe has been approved by the user, and the market competitiveness is further improved.

The steel pipe produced without using the roller pass (major semi-axis) of the three-roller reducing mill according to the method of the present invention can be visually inspected for the inner hole of the steel pipe by naked eyes: triangular or duck-egg-shaped and black threads on the outer surface of the steel pipe.

The steel pipe produced by using the roller pass (major semi-axis) of the three-roller reducing mill according to the method of the present invention can be visually inspected by naked eyes for better ellipticity of the inner diameter of the steel pipe and roundness of the inner hole. Black thread and rolling on the outer surface of the steel pipe are eliminated.

It will be appreciated by those skilled in the art that the present invention may be practiced in other embodiments that do not depart from the spirit or essential characteristics thereof. Accordingly, the disclosed embodiments are to be considered in all respects only as illustrative and not restrictive. All changes that come within the meaning and range of equivalency of the claims are to be embraced within their scope.

The invention claimed is:

1. A method for measuring roller pass major semi-axis of a three-roller reducing mill, comprising the steps of:
    selecting a corresponding value of the average diameter of an elliptical pass, a value of a first major semi-axis and a value of a minor semi-axis from a three-roller pass data table according to a rack station number of a special numerical control lathe;
    calculating a value of a first line segment according to an elliptic equation, the obtained value of the first major semi-axis, and the obtained value of the minor semi-axis;
    calculating a value of a second major semi-axis according to the right-angle triangle theorem and the value of the first line segment;
    measuring a value of a first dimension by attaching three claws of a three-claw internal micrometer to three roller gaps; or attaching one end of inner calipers to any roller gap, and attaching the other end to the bottom of a roller arc opposite the roller gap to obtain a value of a second dimension;
    comparing the value of the first dimension with the second major semi-axis, and, if the value of the first dimension is equal to twice of the second major semi-axis, then determining that the processing size of the major semi-axis of the roller pass of the three-roller reducing mill is correct, otherwise determining that the processing size of the major semi-axis of the roller pass of the three-roller reducing mill is wrong; or
    comparing the value of the second dimension with the sum of the second major semi-axis and the minor semi-axes, and, if the value of the second dimension is equal to the sum of the second major semi-axis and the minor semi-axes, then determining that the processing dimension of the major semi-axis of the roller pass of the three-roller reducing mill is correct, otherwise determining that the processing dimension of the major semi-axis of the roller pass of the three-roller reducing mill is wrong;
    wherein:
       the three-roller reducing mill pass is comprised of one end of three rollers with an included angle of 120° between axes;
       the one end of each roller is formed by two axially symmetric inclined planes sandwiching an elliptical arc;
       the inclined planes of two adjacent rollers are closely attached to each other so that three elliptical arcs are connected end to end to form the three-roller reducing mill pass,
       the included angle between the inclined plane and the axis is 60°;
       the focus point of the elliptical arc is located on the axis, and the included angle between the lines connecting the focus point to two end points of the elliptical arc is 120°;
       the first segment is half of a connecting line for connecting two end points of the elliptical arc; and
       the second major semi-axis is a connecting line for connecting the focal point and one end point of the elliptical arc.

2. The method for measuring roller pass major semi-axis of three-roller reducing mill according to claim 1, further comprising:
    calculating the value of the second major semi-axis according to the Pythagorean theorem or as a trigonometric function of the right-angle triangle, the value of the first segment and the included angle $\alpha 1$ between the first segment and the second major semi-axis, wherein the included angle $\alpha 1$ is 30°;
    wherein the right-angled triangle is comprised of the first segment, the second major semi-axis and the second segment successively connected end to end.

3. The method for measuring roller pass major semi-axis of the three-roller reducing mill according to claim 1, wherein
    the elliptic equation is:

$$X^2\left(\frac{1}{a^2} + \frac{1}{3b^2}\right) = 1,$$

in which X is the value of the first segment, a is the value of the first major semi-axis and b is the value of the minor semi-axes.

* * * * *